(12) United States Patent
Klemarczyk

(10) Patent No.: US 7,714,037 B1
(45) Date of Patent: May 11, 2010

(54) PHOTOINITIATED CATIONIC EPOXY COMPOSITIONS AND ARTICLES EXHIBITING LOW COLOR

(75) Inventor: Philip T. Klemarczyk, Canton, CT (US)

(73) Assignee: Henkel Corporation, Rocky Hill, CT (US)

( * ) Notice: Subject to any disclaimer, the term of this patent is extended or adjusted under 35 U.S.C. 154(b) by 405 days.

(21) Appl. No.: 11/611,370

(22) Filed: Dec. 15, 2006

(51) Int. Cl.
  C08F 2/50 (2006.01)
  C08J 3/28 (2006.01)
  C08J 7/18 (2006.01)
  C09K 3/00 (2006.01)
  B32B 37/12 (2006.01)

(52) U.S. Cl. .......... 522/170; 522/168; 522/31; 522/55; 427/508; 427/516; 156/60; 156/349; 252/182.11; 252/182.12; 252/182.18; 252/182.22

(58) Field of Classification Search .......... 522/31, 522/55, 168, 170; 252/182.11, 182.12, 182.18, 252/182.22; 156/60, 349; 427/508, 156
See application file for complete search history.

(56) References Cited

U.S. PATENT DOCUMENTS

| | | | |
|---|---|---|---|
| 4,058,400 A | 11/1977 | Crivello | |
| 4,058,401 A | 11/1977 | Crivello | |
| 4,219,654 A | 8/1980 | Crivello | |
| 4,256,828 A * | 3/1981 | Smith | 522/31 |
| 4,275,190 A * | 6/1981 | Dudgeon | 528/361 |
| 4,308,118 A * | 12/1981 | Dudgeon | 428/63 |
| 4,916,805 A | 4/1990 | Ellrich et al. | |
| 5,079,378 A | 1/1992 | Crivello | |
| 5,395,862 A | 3/1995 | Neckers et al. | |
| 5,403,569 A * | 4/1995 | Abdelmalek | 423/242.7 |
| 5,445,855 A * | 8/1995 | Tokita et al. | 428/65.1 |
| 5,451,343 A | 9/1995 | Neckers et al. | |
| 5,545,676 A | 8/1996 | Palazzotto et al. | |
| 5,550,265 A | 8/1996 | Castellanos et al. | |
| 5,668,192 A | 9/1997 | Castellanos et al. | |
| 6,147,184 A | 11/2000 | Castellanos et al. | |
| 6,153,661 A | 11/2000 | Castellanos et al. | |
| 6,291,540 B1 | 9/2001 | Priou et al. | |
| 6,777,460 B2 | 8/2004 | Palazzotto et al. | |
| 2007/0267134 A1 * | 11/2007 | Konarski et al. | 156/273.3 |

FOREIGN PATENT DOCUMENTS

| | | |
|---|---|---|
| EP | 0 369 645 A1 | 5/1990 |
| EP | 0 563 925 B1 | 2/2000 |
| WO | WO 97/36516 A1 | 10/1997 |
| WO | WO 98/46647 A1 | 10/1998 |
| WO | WO 2004/011848 A2 | 2/2004 |
| WO | WO 2006/001928 A1 | 1/2006 |

OTHER PUBLICATIONS

ICIS search—Global Chemical Suppliers Search Results for (tolylcumyl)iodonium Tetrakis(pentafluorophenyl)borate (178233-72-2). [online], [retrieved on Sep. 10, 2009]. Retrived from the Internet <URL: http://www.icis.com/Search/ProductNumber/308969/World/(tolylcumyl)iodonium+Tetrakis(pentafluorophenyl)borate+(178233+72+2).htm>.*
Noveon Product Data Sheet: HYCAR—Reactive Liquid Polymer CTBN 1300x13 & CTBN 1300x13F. [online], [retrieved from the internet on Sep. 4, 2009]. Retrieved from the Interner <URL:www.emeraldmaterials.com>.*
CVC Thermoset Speciialities Techincal Bulletin for EPALLOY 5000 (Aug. 21, 2008). [online]. [retreived from the internet on Sep. 10, 2009]. Retreived from the internet:<URL: hiltondavis.emeraldmaterials.com>.*

* cited by examiner

Primary Examiner—Sanza L McClendon
(74) Attorney, Agent, or Firm—Steven C. Bauman

(57) ABSTRACT

A photoinitiated cationically curable composition is provided, including at least one substantially saturated epoxy component comprising at least two glycidyl ether groups; at least one acrylonitrile/butadiene copolymer; and at least one cationic photoinitiator. The compositions exhibit excellent strength properties as well as reduced color formation upon curing, particularly after post-curing thermal treatments. Methods of bonding substrates with such compositions and articles prepared therefrom are also provided through the invention.

41 Claims, No Drawings

PHOTOINITIATED CATIONIC EPOXY COMPOSITIONS AND ARTICLES EXHIBITING LOW COLOR

BACKGROUND OF THE INVENTION

1. Field of the Invention

The present invention is directed to photoinitiated cationic epoxy compositions having good impact strength and toughness, as well as low color after curing.

2. Brief Description of Related Technology

Photoinitiated, cationically curable adhesive compositions based on epoxy resins have many benefits and advantages desirable to end user consumers. For example, such compositions provide cured products having physical properties comparable to those provided by thermosetting compositions, are less inhibited by oxygen than photoinitiated free radical curable compositions (resulting in faster and more thorough cure), and exhibit less shrinkage during cure than otherwise comparable photoinitiated free radical curable compositions (such as those based on acrylic chemistry).

Photoinitiated cationic adhesive compositions have, therefore, been used in various well-known applications such as liquid crystal displays and as laminates in digital video discs. However, current photoinitiated cationic adhesive compositions exhibit color formation after curing, such as a yellowing or browning of the composition. Moreover, such photoinitiated cationic adhesive compositions are typically further subjected to thermal processing, such as during a subsequent heat curing step (i.e. a "post-cure") to ensure full curing of the composition, or other heat treatment of the composition for certain applications, depending on the intended use. Such thermal processing typically enhances the color formation, resulting in further yellowing or browning of the composition. In many applications, this color formation is undesirable, thereby reducing the usefulness of such adhesive compositions for certain applications, for example in the medical industry, such as adhesives for medical devices.

U.S. Pat. No. 6,777,460 to Palazzotto et al. discloses curing agents for cationically curable compositions which reduce coloring of the compositions. The curing agents include combinations of various photochemically active and non-photochemically active salts.

Thus, there has been an ongoing desire to find photoinitiated adhesive compositions that not only have good impact strength and toughness, but that also exhibit little to no color change after cure and/or after thermal exposure.

SUMMARY OF THE INVENTION

The present invention provides a photoinitiated cationically curable composition, comprising at least one substantially saturated epoxy component comprising at least two glycidyl ether groups; at least one acrylonitrile/butadiene copolymer; and at least one cationic photoinitiator. Such compositions, when cured, are colorless, or exhibit reduced color formation after curing, as well as during thermal treatment processes, when compared with similar compositions which do not include at least one acrylonitrile/butadiene copolymer.

In a further embodiment, the present invention also provides a method for bonding a pair or more of substrates. The method of bonding substrates comprises the steps of: (a) providing a first substrate; (b) providing a second substrate; (c) providing a composition as described above on at least one of the first or second substrates; (d) mating the first and second substrates; and (e) exposing the composition to conditions sufficient to initiate cure thereto. Such curing may be effected by exposing the composition to ultraviolet radiation within a wavelength of from about 254 to 405 nm to initiate curing. In addition or alternatively thereto, the composition may be exposed to temperatures of from about 60 to 140° C.

In yet a further embodiment, the present invention provides a method of curing a composition, comprising the steps of: (a) providing a composition comprising at least one substantially saturated epoxy component comprising at least two glycidyl ether groups; at least one acrylonitrile/butadiene copolymer; and at least one cationic photoinitiator; (b) exposing the composition to ultraviolet radiation to initiate curing of the composition; and (c) exposing the composition to temperatures of from about 60 to 140° C., wherein the cured composition exhibits little to no color change after the thermal exposure. After such method of curing a composition, the cured composition exhibits less color than a color of a composition formed by the same curing process and thermal exposure, and from the same components in the same amounts, except for the absence of the at least one acrylonitrile/butadiene copolymer.

Additionally, the present invention provides a method of preventing color formation in a curable composition including at least one epoxy component and a cationic photoinitiator subjected to ultraviolet curing followed by thermal exposure, where the method comprises the step of incorporating at least one acrylonitrile/butadiene copolymer into the composition prior to subjecting the composition to ultraviolet curing and thermal exposure.

The present invention further provides a method of preventing color formation during thermal treatment of a cationically cured composition, comprising the steps of: (a) providing a cationically cured composition comprising at least one substantially saturated epoxy component comprising at least two glycidyl ether groups; at least one acrylonitrile/butadiene copolymer; and at least one cationic photoinitiator; and (b) heating the cationically cured composition to form a fully cured composition, where the resulting color of the fully cured composition exhibits little to no color change from the color of the canonically cured composition prior to the heating step. After such method of preventing color formation during thermal treatment of a cationically cured composition, the resulting color of the thermally cured composition exhibits less color than a color of a composition formed by the same curing process and heating step, and from the same components in the same amounts, except for the absence of the at least one acrylonitrile/butadiene copolymer.

DETAILED DESCRIPTION OF THE INVENTION

Other than in the operating examples, or where otherwise indicated, all numbers expressing quantities of ingredients, thermal conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As noted above, the present invention provides a photoinitiated canonically curable composition, comprising at least one substantially saturated epoxy component comprising at least two glycidyl ether groups; at least one acrylonitrile/butadiene copolymer; and at least one cationic photoinitiator.

The compositions of the present invention comprise one or more substantially saturated epoxy components, such as for example compounds, polymers, resins, or the like. As used herein, "substantially saturated" means that the epoxy material has single covalent bonds between carbon atoms in the chain, for example an alkylene moiety, or the epoxy resin can have several double bonds (conjugated or non-conjugated, and/or as part of a non-aromatic ring) between the carbon atoms, for example an alkenylene moiety or cyclohexene moiety. In some embodiments, the epoxy component is fully saturated or hydrogenated. In some embodiments, the epoxy component is free of carbonyl groups along the backbone.

Embraced within the substantially saturated epoxy component are those compounds within the following structure

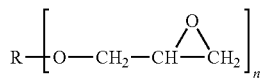

where n is 2-7 and R is any substantially saturated hydrocarbon, optionally containing ether or ester linkages. R therefore may be alkyl, alkenyl or cycloalkyl.

Non-limiting examples of such substantially saturated epoxy components include $C_2$-$C_{70}$ alkyl glycidyl ethers; $C_2$-$C_{70}$ alkyl glycidyl esters (such as epoxidized castor oils); cycloalkyl or cycloalkenyl glycidyl ethers; or polyglycidyl ethers of hydrogenated pyrocatechol, hydrogenated resorcinol, hydrogenated hydroquinone (or 1,4-dihydroxy cyclohexane), 4,4-dihydroxydicyclohexyl methane (or hydrogenated bisphenol 4,4'-dihydroxy-3,3'-dihydroxydicyclohexyl methane, 4,4'-dihydroxydicyclohexyl dimethyl methane (or hydrogenated bisphenol A), such as EPALLOY 5000 available from CVC Specialty Chemicals Inc. of Moorestown, N.J. or hydrogenated EPON bisphenol A epoxy resins, for example EPONEX 1510 diglycidyl ether of hydrogenated bisphenol A epoxy resin available from Hexion of Houston, Tex., having the structure:

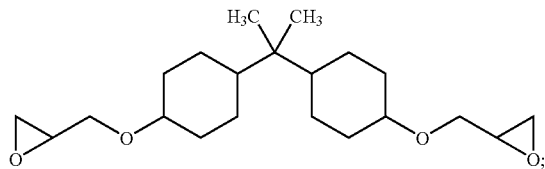

and diglycidyl ethers of hydrogenated bisphenol A epoxy resins such as EPON 825, EPON 826, EPON 829, EPON 1001F; EPON 1002F; EPON 1004F; EPON 1007F; EPON 1009F (CAS No. 25036-25-3) EPON 3001; EPON 3002; EPON 2002; EPON 2003; EPON 2004; EPON 2005; EPON 2012; EPON 2014; EPON 2024; and EPON 2042 epoxy resins available from Resolution Performance), 4,4'-dihydroxydicyclohexyl methyl methane, 4,4'-dihydroxydicyclo-hexyl cyclohexane, 4,4'-dihydroxy-3,3'-dimethyldicyclohexyl propane, 4,4'-dihydroxydicyclohexyl sulfone (or hydrogenated bisphenol S), tris(4-hydroxycyclohexyl)methane, butanediol diglycidyl ether and combinations thereof.

Other epoxy resins suitable for use in the present invention include diglycidyl ethers of hydrogenated epoxy materials such as SU-8 (bisphenol A-type epoxy novolac); from Dow Chemical Co. under the DER trade designation, such as DER 331, DER 332, DER 383, DER 354, and DER 542; from Vantico Inc., Brewster, N.Y. under the ARALDITE tradename, such as ARALDITE [phenol-4,4'-(1-methylethylidene)bis with (chloromethyl)oxirane (CAS No. 25068-38-6)], ARALDITE ECN 1299 [formaldehyde, polymer with (chloromethyl)oxirane and 2-methylphenol, melting point 85-100° C. (CAS No. 29690-82-2)]. ARALDITE ECN 1285 [formaldehyde, polymer with (chloromethyl)oxirane and 2-methylphenol, melting point 80-90° C. (CAS No. 29690-82-2)], and ARALDITE GT 7097 US [(phenol, 4-(1,1-dimethylethyl), polymer with (chloromethyl)oxirane and 4,4'-(1-methylethylidene)bis, melting point 113-123° C. (CAS No. 67924-34-9)]; and from Nippon Kayaku, Japan, BREN-S (a brominated epoxy resin, which is particularly useful for fire retardancy). Cresol analogs are also available under the tradenames ECN 1235, ECN 1273, and ECN 1299 from Ciba Specialty Chemicals. Combinations or mixtures of the different epoxy resins discussed above also can be used.

The epoxy component can be present in an amount up to about 99 percent by weight, such as about 40 to about 98 percent by weight, for example about 85 to about 95 percent by weight on a basis of total weight of the composition.

In some embodiments, the composition can further comprise up to about 25 weight percent, or about 0.1 to about 25 weight percent, of an aromatic (non-hydrogenated) epoxy resin, such as the bisphenol A epoxy materials mentioned above.

The composition also comprises one or more cationic photoinitiators. Suitable cationic photoinitiators include those having as a counter ion a phosphorous or antimony metal complex with the appropriate number of halogen (such as fluorine) atoms per metal atom. In the context of surface mount electronic component attachment, see U.S. Pat. No. 4,916,805 (llnrich), which discloses certain photoinitiators having counter ions, such as $PF_6^-$, $BF_4^-$, $AsF_6^-$ and $SbF_6^-$.

Other cationic photoinitiators suitable for use herein include onium salts represented by the general formula:

$$[R^{22}\text{-}A^+]_m[X^-]_n$$

where:

$R^{22}$ is one or more aromatic radicals which can be the same or different, for example aryl, alkaryl, and aralkyl groups, including fused ring structures comprising an aromatic ring, which may be optionally substituted with a linear, branched or cyclic $C_8$ to $C_{20}$ radical of alkyl, alkylene, alkoxy, alkyleneoxy, a nitrogen, oxygen or sulfur heterocyclic radical of 4 to 6 carbon atoms in the ring, or a mixture thereof;

$A^+$ is selected from iodonium cation mono-substituted with $C_1$ to $C_{20}$ alkyl or aryl optionally substituted with $C_1$ to $C_{20}$ alkyl or alkoxy and sulfonium cation di-substituted with $C_1$ to $C_{20}$ alkyl or aryl optionally substituted with $C_1$ to $C_{20}$ alkyl or alkoxy or a mixture thereof;

$X^-$ is a non-basic, non-nucleophilic anion, examples of which include $PF_6^-$, $BF_4^-$, $AsF_6^-$, $SbF_6^-$, $ClO_4^-$, $CF_3SO_3^-$, $(C_5F_5)_{4B}^-$ and the like;

m ranges from 1 to 3; and n ranges from 1 to 3, where m is equal to n.

Non-limiting examples of such cationic photoinitiators include diaryliodonium, triarylsulfonium, diaryliodosonium, triarylsulfoxonium, dialkylphenacylsulfonium and alkylhydroxyphenylsulfonium salts. See e.g. U.S. Pat. Nos. 4,219,654 (Crivello); 4,058,400 (Crivello); 4,058,401 (Crivello) and 5,079,378 (Crivello). Other examples include triarylsulfonium and diaryliodonium salts containing non-nucleophilic counterions such as diphenyl iodonium chloride, diphenyl iodonium hexafluorophosphate, 4,4-dioctyloxydiphenyl iodonium hexafluorophosphate, triphenylsulfonium tetrafluoroborate, diphenyltolylsulfonium hexafluorophosphate, phenylditolylsulfonium hexafluoroarsenate, and diphenylthiophenoxyphenylsulfonium hexafluoroantimonate, and those available from Sartomer, Exton, Pa. under the SARCAT tradename, such as SARCAT CD 1010 [triaryl sulfonium hexafluoroantimonate (50% in propylene carbonate)]; SARCAT DC 1011 [triaryl sulfonium hexafluorophosphate (50% n-propylene carbonate)]; SARCAT DC 1012 (diaryl iodonium hexafluoroantimonate); SARCAT K185 [triaryl sulfonium hexafluorophosphate (50% in propylene carbonate)] and SARCAT SR1010 [triarylsulfonium hexafluoroantimonate (50% in propylene carbonate)]; and SARCAT SR1012 (diaryliodonium hexafluoroantimonate), and those available from Dow under the CYRACURE tradename, such as UVI-6976 mixture of triarylsulfonium hexafluoroantimonate salts in propylene carbonate, the triarylsulfonium hexafluoroantimonate salts being selected from:

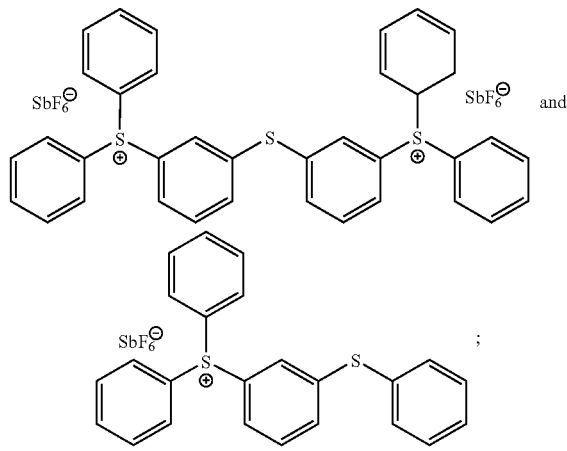

and UVI-6992 (mixed triarylsulfonium hexafluorophosphate salts).

Other useful cationic photoinitiators include UV 9385C (an alkylphenyl iodonium hexafluorophosphate salts) and UV 9390C (an alkylphenyl iodonium/hexafluoroantimonate salt) available from General Electric Corporation; CGI 552 (an alkylphenyl iodonium hexafluorophosphate salt); and RADCURE UVACure 1590 available from UCB, Belgium; and a cationic photoinitiator for silicone-based release coatings, whose counter ion contains fluoride atoms covalently bound to aromatic carbon atoms of the counter ion, such as $B(C_6F_5)_4$ available from Rhodia Chemie. See International Patent Application Nos. PCT/FR97/00566 and PCT/FR98/00741. See also Rhone-Poulenc Chemie's U.S. Pat. Nos. 5,550,265 (Castellanos), 5,668,192 (Castellanos), 6,147,184 (Castellanos), and 6,153,661 (Castellanos).

Other useful cationic photoinitiators include those having a core cation of structure I below:

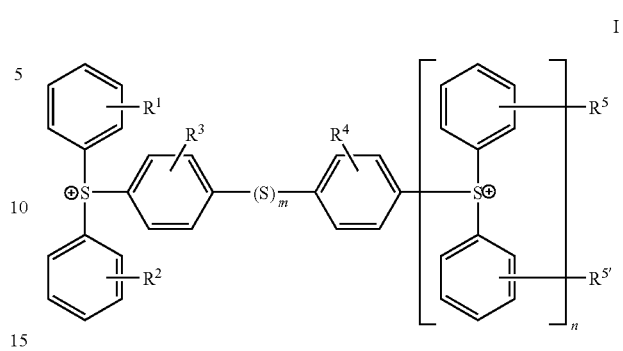

where $R^1$, $R^2$, $R^3$, $R^4$, $R^5$ and $R^{5'}$ are each independently selected from H, $C_{1-6}$ alkyl, $C_{2-6}$ alkenyl, halogen, hydroxyl and carboxyl, n is 0-3 and m is 0-1, such as for example those represented by structures II and III:

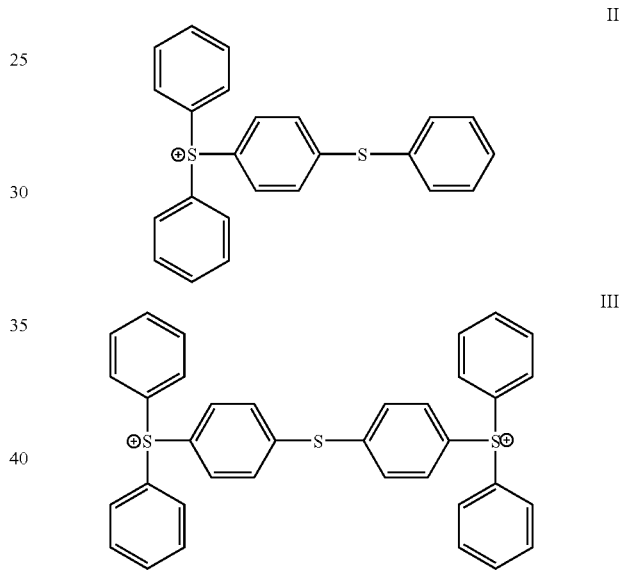

Other useful cationic photoinitiators include those having core cations of structures IV, V, and VI:

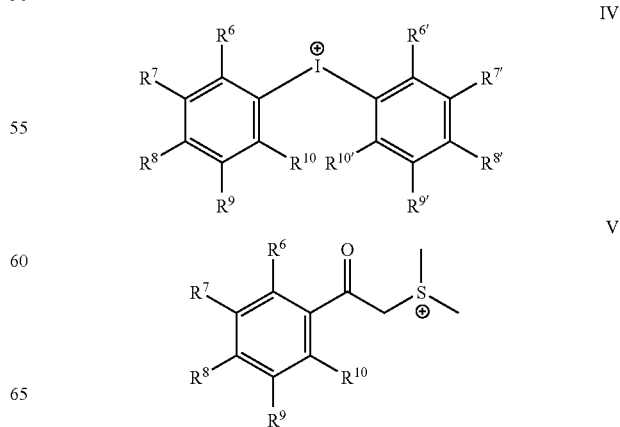

-continued

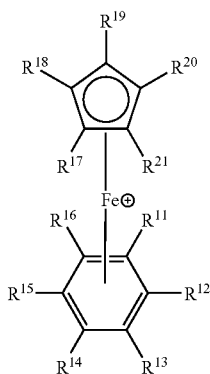

VI

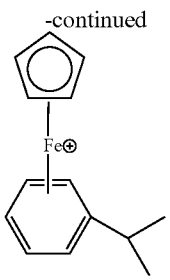

where:

for structure IV, $R^6$, $R^7$, $R^8$, $R^9$ and $R^{10}$ are each independently selected from H, alkyl, such as from 1 to 5 carbon atoms, halogen, hydroxyl, and carboxyl;

for structure V, $R^6$, $R^7$, $R^8$, $R^9$, $R^{10}$, $R^{6'}$, $R^{7''}$, $R^{8'}$, $R^{9'}$, and $R^{10'}$ are each independently selected from H, alkyl, such as from 1 to 5 carbon atoms, halogen, hydroxyl, and carboxyl; and for structure VI, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ are each independently selected from H, alkyl, such as from 1 to 5 carbon atoms, halogen, hydroxyl, and carboxyl.

More specific examples of cationic photoinitiators having core cations within structure IV, V and VI include those represented by structures VII(a) and VII(b), VIII and IX (the latter of which is available under the tradename IRGACURE 261 from Ciba Specialty Chemicals), respectively:

VII(a)

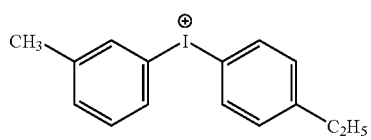

VII(b)

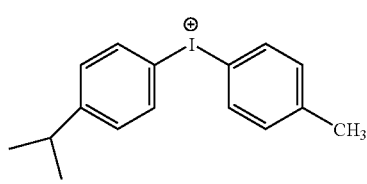

VIII

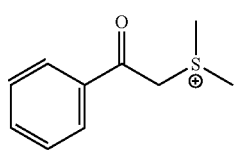

Structure VII(b) is the cationic portion of the RHODOSIL 2074 photoinitiator, available from Rhodia Chemie, whose chemical name is tolylcumyl iodonium tetrakis(pentafluorophenyl)borate (CAS No, 178233-72-2).

The cationic photoinitiator can be present in an amount of up to about 5 percent by weight, such as about 0.01 to about 3, for example 0.5 to 2 percent by weight on a basis of total weight of the composition.

As noted, photoinitiated cationic adhesive compositions can exhibit color formation after curing, such as a yellowing or browning of the composition. It has been unexpectedly found through the present invention that incorporating certain copolymers into the composition prior to curing reduces or eliminates such color formation. As such, these compositions can produce colorless cured compositions or cured products with reduced color when compared with conventional cationically cured compositions. This reduction in color formation is particularly apparent in applications in which the photoinitiated cationic adhesive compositions are subjected to thermal processing after the curing process, such as during a subsequent heat curing step or other post-cure processing steps which may involve heat treatment.

In particular, it has been discovered that incorporating at least one acrylonitrile/butadiene copolymer into the adhesive composition prior to curing of the composition reduces or eliminates color formation during curing of the composition, after curing of the composition, and/or during a post-cure thermal treatment.

Generally, the copolymers useful in the present invention include the following chemical structure:

$$R^t \diagdown \diagup \diagdown [\phantom{x}]_x [\phantom{CN}]_y R^t$$

where the ratio of x:y ranges from about 10:1 to about 3:1; and where each $R^t$ is H or a terminal reactive group, the terminal reactive group being a hydroxyl functional group, a vinyl functional group, a carboxyl functional group, an epoxy functional group or an acrylate functional group. In one embodiment, at least one $R^t$ is a terminal reactive group. Copolymers exhibiting hydroxyl termination or vinyl termination are particularly useful in the present invention.

In some embodiments, the mole percentage of acrylonitrile in the copolymer is up to about 30%, such as from about 10 to 26% and the mole percentage of butadiene in the copolymer is from about 74 to 90%. In one embodiment, the number-average molecular weight of the copolymer is up to about 4000.

Desirably, the composition comprises up to about 25 weight percent, or from about 0.1 to about 25 weight percent, of at least one acrylonitrile/butadiene copolymer, based on the total weight of the composition.

Non-limiting examples of suitable acrylonitrile/butadiene copolymers include the commercially available HYCAR® 1300 Series reactive liquid polymers produced by Noveon, Inc. and distributed by Hanse Chemie AG of Geesthacht, Germany. The HYCAR® 1300 Series includes carboxyl terminated acrylonitrile/butadiene copolymers, such as CTBN 1300X47, CTBN 1300X31, CTBN 1300X8, CTBN 1300X8 F, CTBN 1300X13, CTBN 1300X13 F, CTBN 1300X13 CL, CTBN 1300X13 NA, CTBNX 1300X9, and CTBNX 1300X18. The HYCAR® 1300 Series also includes methacrylate vinyl terminated acrylonitrile/butadiene copolymers, such as VTBNX 1300×33 and VTBNX 1300X43. The HYCAR® 1300 Series further includes epoxy terminated acrylonitrile/butadiene copolymers, such as ETBN 1300X40 and ETBN 1300X44. Hydroxyl terminated acrylonitrile/butadiene copolymers may be synthesized in a laboratory via known methods or methods heretofore developed, and are also suitable for use in the present composition.

In addition to the reduced color formation seen through the present invention, the incorporation of the acrylonitrile/butadiene copolymer further imparts improved strength properties to the composition, thereby providing a toughening aspect to the composition.

The composition can further comprise one or more free radical initiators. Many suitable free radical initiators are available, though benzophenone, 1-hydroxycyclohexyl phenyl ketone, 2,2-dimethoxy-2-phenyl acetophenone (such as IRGACURE 651 available from Ciba) and combinations thereof (such as the thinner two in a 1:1 by weight ratio available from Ciba under the tradename IRGACURE 500) are particularly desirable. Other useful free radical initiators available from Ciba include 2-benzyl-2-N,N-dimethylamino-1-(4-morpholino phenyl)-1-butane (IRGACURE 369), 2-methyl-1-[4(methylthio)phenyl]-2-morpholino propane-1-one (IRGACURE 907), 2-hydroxyl-2-methyl-1-phenyl-propane-1-one (DAROCURE 1173), 1-hydroxycyclohexyl phenyl ketone, 2,2-dimethoxy-2-phenyl acetophenone, bis(2,6-dimethoxybenzoyl-2,4,4-trimethyl pentyl) phosphine oxide, bis(2,4,6-trimethyl benzoyl)phenyl phosphine oxide, 4-(2-hydroxyethyoxy)phenyl-(2-hydroxy-2-methyl-propyl)ketone, 2,4,6-trimethylbenzoyl-diphenylphosphine oxide, and combinations thereof.

The free radical initiator can be present in an amount of up to about 5 percent by weight, such as about 0.01 to about 3 percent by weight, for example 0.5 to 2 percent by weight of the composition.

The cationic photoinitiator and the free radical initiator can be used in a ratio of 4:1 to 1:4, such as 2:1 to 1:2, for example 1.5:1 to 1:1.5, to achieve acceptable open cure time and as modified within that range by the end user consumer, depending on the end user consumer preferences.

In some embodiments, the composition can further comprise one or more visible light photoinitiators and/or photosensitizers. An example of such a material is camphorquinone ("CPQ"), though others such as 9-fluorene carboxylic acid peroxyesters, visible light [blue] photoinitiators, IRGACURE 784DC (photoinitiator based on substituted titanocenes), and combinations thereof, may be used.

Other suitable photoinitiator systems triggered in the visible range of electromagnetic spectrum may be used and include those disclosed in: U.S. Pat. No. 4,505,793 (Tamoto) which discloses a combination of a 3-keto-substituted cumarin compound and active halogeno compound photopolymerization initiators that cure by exposure to light having wavelengths ranging between about 180 nm and 600 nm; European Patent Publication No. EP 0 369 645 A1 which discloses a three-part photoinitiator system which includes a trihalomethyl substituted-s-triazine, a sensitizing compound capable of absorbing radiation in the range of about 300-1000 nm (such as ketones; coumarin dyes; xanthene dyes; 3H-xanthen-3-one dyes; acridine dyes; thiazole dyes; thiazine dyes; oxazine dyes; azine dyes; methane and polymethine dyes; porphyrins; aromatic polycyclic hydrocarbons; merocyanines; and squarylium dyes) and an electron donor (such as ethers; ferrocene; sulfinic acids and their salts; salts of ferrocyanide; ascorbic acid and its salts; dithiocarbamic acid and its salts; salts of xanthates; salts of ethylene diamine tetraacetic acid; and salts of tetraphenylboronic acid); European Patent Publication No. EP 0 563 925 A1 which discloses photopolymerization initiators including a sensitizing compound that is capable of absorbing radiation in the range of about 250-1000 mm (such as cyanine dye, merocyanine dye, coumarin dye, ketocoumarin dye, (thio)xanthene dye, acridine dye, thiazole dye, thiazine dye, oxazine dye, azine dye, squarylium dye, porphyrin dye, triaryl methane dye, (poly) methane dye, and aromatic polycyclic hydrocarbons); U.S. Pat. No. 5,395,862 (Neckers) which discloses fluorone initiator systems including a coinitiator that is capable of accepting an electron from the excited fluorone species (such as onium salts, nitrohalomethanes and diazosulfones); U.S. Pat. No. 5,451,343 (Neckers) which discloses fluorone and pyronin-Y derivatives as initiators that absorb light at wavelengths of greater than 350 mm; and U.S. Pat. No. 5,545,676 (Palazzotto) which discloses a three-part photoinitiator system including an arylidonium salt, a sensitizing compound and an electron donor which cures under UV or visible light, each of the foregoing references being incorporated by reference herein.

These photoinitiators triggered in the visible range of the electromagnetic spectrum may be present in amounts of about 0.1% to about 10% by weight, for example 0.5% to about 5% by weight on a basis of total weight of the composition.

When used, these photoinitiators can permit the inventive compositions to cure dry-to-the-touch, forming reaction products with tack-free exterior surfaces.

The inclusion of such a photoinitiator broadens the energy sources available to cure the inventive composition. For example, a LED device generating radiation in or about 470 mm may be used to cure the inventive compositions, such as is described in International Patent Publication No. WO 04/011848 and International Patent Application No. PCT/US2005/016900, each of which is incorporated by reference herein.

In some embodiments, one or more oxetane-containing compounds may be included in the inventive compositions. These oxetane-containing compounds seem to improve photocure and/or toughness of the composition. Examples of such oxetanes include

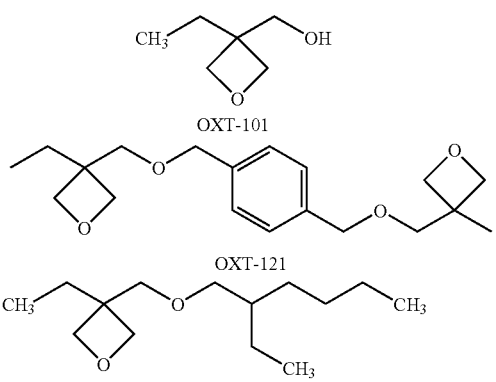

OXT-101

OXT-121

OXT-212
(available from Toa Gosei Co., Ltd., Japan)

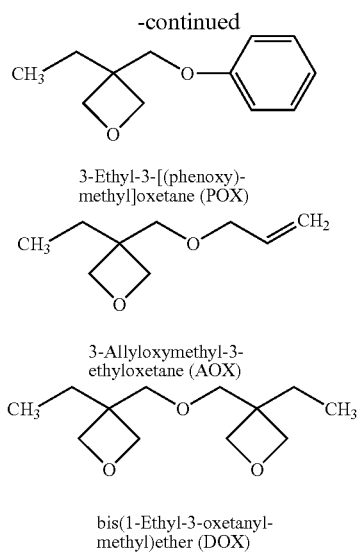

3-Ethyl-3-[(phenoxy)-methyl]oxetane (POX)

3-Allyloxymethyl-3-ethyloxetane (AOX)

bis(1-Ethyl-3-oxetanyl-methyl)ether (DOX)

The composition can further comprise one or more reactive diluents, for example polyols or diols such as dibenzyl alcohol, diethylene glycol, polyethylene glycol, or poly THF diol. Useful polyester and/or polyether diols and polyols are available from King Industries, such as those under the trade designations K-FLEX 128 (polyester/polyether diol) and K-FLEX XM-A307 (polyester diol), or TONE 0201, 0210 or 0310 available from Dow Chemical. The reactive diluent may be added to modify the glass transition temperature ("Tg") and modulus of the cured reaction product by participating in the cross-linking reaction with the epoxy under cure conditions. The reactive diluents also can improve adhesion on substrates constructed from various plastic or synthetic materials, and oftentimes metals.

In some embodiments, elastomers or polyacrylates can be included in the composition. Suitable polyacrylates can have at least one terminal group represented by —$SiR^A_3$, where each $R^A$ is independently selected from hydrogen or a $C_1$ to $C_{20}$ hydrocarbon radical, —$C_6H_5$, —$CH_2OH$, phenyl, alkoxy and —CN, provided that in at least one instance $R^A$ is alkoxy. Alkyl (meth)acrylate polyacrylate(s) may be included in the composition. Suitable alkyl (meth)acrylate polyacrylates include homopolymers of $C_1$-$C_{10}$ (meth)acrylates or copolymers of $C_1$-$C_{10}$ (meth)acrylates. Suitable alkyl (meth)acrylates include, but are not limited to, ethyl acrylate, butyl acrylate and 2-ethylhexyl acrylate. Copolymeric acrylate elastomers or rubbers may contain copolymerized units of up to 40 weight percent monovinyl monomers, for example, styrene, acrylonitrile, vinylbutyl ether, acrylic acid and $C_1$-$C_{10}$ alkyl acrylates different from the principal alkyl acrylate comonomer.

The elastomer may also be a polyfunctional (meth)acrylate polymer. Such polymers may have a high degree of functionality due to the presence of multiple functional groups in the main chain of the polymer, as well as functional terminal groups. In some embodiments, such elastomers may include a polyfunctional (meth)acrylate portion and at least one monofunctional (meth)acrylate portion. The polyfunctional (meth)acrylate portion may compose the main chain of the polymer while the monofunctional (meth)acrylate portions are terminal groups.

For example, the elastomer may be a (meth)acryloyl-terminated vinyl polymer. Such vinyl polymers accordingly may have at least one terminal functional group per molecule represented by: —$OC(O)C(R)=CH_2$. The number of these groups per molecule is not particularly restricted, but is desirably not less than 1 per molecule. In some embodiments, the number of the groups per molecule is 1.2 to 4. R represents hydrogen or an organic group of 1 to 20 carbon atoms for example hydrogen or a hydrocarbon group of 1 to 20 carbon atoms, thus including such species as —H, —$CH_3$, —$CH_2CH_3$, —$(CH_2)_nCH_3$, where n is an integer of 2 to 19, —$C_6H_5$, —$CH_2OH$ and —CN, among others. More desired are —H and —$CH_3$, and —$CH_2OH$.

The composition can further comprise one or more inorganic filler components, such as reinforcing silicas or fused silicas that may be untreated or treated so as to alter the chemical nature of their surface. Virtually any reinforcing fused silica may be used. Alternatively, the inorganic filler component may be a fumed silica, which may impart thixotropy to the composition. Other useful materials for the inorganic filler component include those comprising aluminum oxide, silicon nitride, aluminum nitride, silica-coated aluminum nitride and micronized quartz, provided they are not basic in nature.

In some embodiments, the composition includes up to about 98 weight percent, for example about 45 weight percent to about 90 weight percent, such as from about 35 to about 80 weight percent, desirably about 60 to about 75 weight percent, of the epoxy resin component by weight of the total composition; about 0.1 to about 25 weight percent of acrylonitrile/butadiene copolymer by weight of the total composition; and up to about 5 weight percent, such as about 0.01 to about 2 weight percent of the cationic photoinitiator by weight of the total composition. The composition may further include up to about 25 weight percent of the reactive diluent by weight of the total composition; and up to about 5 weight percent, such as about 0.01 to about 2 weight percent of the free radical initiator, by weight of the total composition. Of course, depending on the particular set of properties desirable for a composition destined for a specific purpose these values may vary somewhat.

The inventive compositions are capable of demonstrating significant improvement in physical properties, such as toughness and impact strength (representing the amount of energy absorbed by a specimen substrate to produce failure) when used to bond metals and plastic substrates. Further, the inventive compositions exhibit little to no color change after thermal and/or ultraviolet radiation exposure. As such, by incorporating acrylonitrile/butadiene copolymers into the adhesive compositions of the present invention, the compositions thus produced provide not only an effective product having improved impact strength, but also a product with little or no color change after curing.

The present invention also provides a method for bonding a pair or more of substrates, using the compositions so described. In some embodiments, the method of bonding substrates comprises the steps of: (a) providing a first substrate; (b) providing a second substrate; (c) providing a composition as described above on at least one of the first or second substrates; (d) mating the first and second substrates; and (e) exposing the composition to conditions sufficient to initiate cure thereto. Such curing may be effected by exposing the composition to ultraviolet radiation within a wavelength of from about 254 to 405 nm to initiate curing. In addition or alternatively thereto, the composition may be exposed to thermal temperatures of from about 60 to 140° C.

The present invention further provides a method of curing a composition, comprising the steps of: (a) providing a composition comprising: i. at least one substantially saturated epoxy material comprising at least two glycidyl ether groups; ii. at least one acrylonitrile/butadiene copolymer; and iii. at least one cationic photoinitiator; (b) exposing the composition to ultraviolet radiation to initiate curing of the composition; and (c) exposing the composition to thermal temperatures of from about 60 to 140° C., wherein the cured composition exhibits little to no color change after the thermal exposure. After such method of curing a composition, the cured composition exhibits less color than a color of a composition formed by the same curing process and thermal exposure, and from the same components in the same amounts, except for the absence of the at least one acrylonitrile/butadiene copolymer. In some embodiments, the composition is exposed to ultraviolet radiation within a wavelength of from about 254 to 405 nm to initiate cure thereto.

Additionally, the present invention provides a method of preventing color formation in a curable composition including at least one epoxy material and a cationic photoinitiator subjected to ultraviolet curing followed by thermal exposure, wherein the method comprises the step of incorporating at least one acrylonitrile/butadiene copolymer into the composition prior to subjecting the composition to ultraviolet curing and thermal exposure. In some embodiments, the composition is exposed to ultraviolet radiation within a wavelength of from about 254 to 405 nm to initiate cure thereto. In other embodiments, the composition is exposed thermal temperatures of from about 60 to 140° C.

The present invention further provides a method of preventing color formation during thermal treatment of a cationically cured composition, comprising the steps of: (a) providing a cationically cured composition comprising: i, at least one substantially saturated epoxy material comprising at least two glycidyl ether groups; ii. at least one acrylonitrile/butadiene copolymer; and iii. at least one cationic photoinitiator; and (b) heating the cationically cured composition to form a fully cured composition, wherein the resulting color of the fully cured composition exhibits little to no color change from the color of the canonically cured composition prior to the heating step. After such method of preventing color formation during thermal treatment of a cationically cured composition, the resulting color of the thermally cured composition exhibits less color than a color of a composition formed by the same curing process and heating step, and from the same components in the same amounts, except for the absence of the at least one acrylonitrile/butadiene copolymer. In some embodiments, the composition is exposed to ultraviolet radiation within a wavelength of from about 254 to 405 µM to initiate cure thereto. In other embodiments, the composition is exposed thermal temperatures of from about 60 to 140° C.

The following examples are presented to further illustrate the invention, without intending to narrow or depart from its scope.

EXAMPLES

In the following examples, samples of cationically curable compositions were prepared from cycloaliphatic epoxides and cationic photoinitiators, with selected acrylonitrile/butadiene copolymers included to demonstrate cure profiles and physical properties, such as impact strength and color changes.

Example 1

Cationically curable compositions were prepared as Sample Nos. 1-7 incorporating the components set forth in Table 1 below. In each of the samples, a cycloaliphatic epoxy resin was combined with a cationic photoinitiator, with varying amounts of other components. The components were combined in plastic brown bottles, and each of the samples were thereafter mixed by hand at room temperature. In addition, Sample No. 6 was sonicated for 30 minutes at 40° C. to ensure that the acrylonitrile/butadiene copolymer was fully dissolved in the sample. Sample Nos. 1-7 were each subjected to testing in order to evaluate the color change that occurred upon heating of the samples. In particular, two grams of each sample thus prepared was poured into individual aluminum weighing pans and exposed to UV light at 140 mW/cm² for 20 seconds. The pans were cut in half and one half of each pan was kept at ambient temperature and the other half was heated at 100° C. for 24 hours. Any change in color at the macroscopic level was observed and recorded, with the results shown in Table 2 below.

TABLE 1

| COMPONENT | Sample No./Amt. (Parts per 100 parts of resin) | | | | | | |
|---|---|---|---|---|---|---|---|
| | 1 | 2 | 3 | 4 | 5 | 6 | 7 |
| Epoxy resin[a] | 100 | 100 | 100 | 100 | 100 | 100 | 100 |
| DEG[b] | 10 | — | — | — | — | — | — |
| HBA[c] | — | 20 | — | — | — | — | — |
| DEGVE[d] | — | — | 20 | — | — | — | — |
| Solketal[e] | — | — | — | 10 | — | — | — |
| Ether glycol[f] | — | — | — | — | 20 | — | — |
| Oxetane/HTBN[g] | — | — | — | — | — | 20/5 | — |
| Photoinitiator[h] | 2 | 2 | 2 | 2 | 2 | 2 | 2 |
| Comments on color of cured formulation without heating: | Light brown | Light brown | Dark reddish brown | Light brown | Light brown | Clear | Light brown |
| Comments on color of cured formulation after heating: | Yellow | Yellow | Dark reddish brown | Light yellow | Yellow | Light yellow | Yellow |

UV cure method: 2 g of material in an Al weighing pan, 20 sec at 140 mW/cm²,
Heat Cure Method: 24 hrs. at 100° C.
[a]Diglycidyl ether of hydrogenated bisphenol A epoxy resin, commercially available as EPONEX 1510 from Hexion.
[b]Diethylene glycol, commercially available from Aldrich.
[c]Hydroxybutyl acrylate, commercially available from Aldrich.
[d]Diethylene glycol vinyl ether, commercially available from Aldrich.
[e]2,2-Dimethyl-1,3-dioxolane-4-methanol, commercially available as Solketal from Aldrich.
[f]polytetramethylene ether glycol;, commercially available as PolyTHF 250 from Aldrich.
[g]Mixture of 3-Ethyl-3-hydroxymethyl-oxetane (commercially available as OXT-101 from Toa Gosei Co., Ltd. of Tokyo, Japan) combined with a hydroxyl terminated acrylonitrile/butadiene copolymer.
[h]Cationic photoinitiator, commercially available as UVI-6976 from Dow Chemical.

As can be seen in Table 1, Sample No. 6, which included the hydroxyl terminated acrylonitrile/butadiene copolymer, combined with an oxetane, exhibited no color after curing, and exhibited only a light yellow color after heat treatment post-curing. Moreover, when Sample No. 6 is directly compared with the remaining samples, and in particular Sample No. 7 (which represents a comparative sample including only the epoxy resin and a cationic photoinitiator), inventive Sample No. 6 exhibits reduced coloring after curing and after a post-cure heat treatment.

Additionally, each of Sample Nos. 1-7 was subjected to differential photocalorimetry ("DPC") and differential scanning calorimetry ("DSC"), and the curing profiles of Sample Nos. 1-6, including inventive Sample No. 6, was consistent with that of the control Sample No. 7, which did not include any additive.

Example 2

Additional cationically curable compositions were prepared as Sample Nos. 8-10 incorporating the components set forth in Table 2 below. In each of the samples, a cycloaliphatic epoxy resin was combined with a cationic photoinitiator, with an oxetane in one sample (Sample No. 8) and with various acrylonitrile/butadiene copolymers in the other samples (Sample Nos. 9 and 10). The components were combined in plastic brown bottles, and each of the samples were thereafter mixed by hand at room temperature. In addition, Sample Nos. 9 and 10 were sonicated for 20 minutes at 50° C. to ensure that the acrylonitrile/butadiene copolymer was fully dissolved in the sample. The samples were each cured and tested to evaluate coloration. In particular, two grams of each sample thus prepared was poured into individual aluminum weighing pans and exposed to UV light at 140 mW/cm$^2$ for 40 seconds. The pans were cut in half and one half of each pan was kept at ambient temperature and the other half was heated at 100° C. for 24 hours. Any change in color at the macroscopic level was observed and recorded, with the results shown in Table 2 below.

TABLE 2

| | Sample No./Amt. (Parts per 100 parts of resin) | | |
|---|---|---|---|
| COMPONENT | 8 | 9 | 10 |
| Epoxy resin$^a$ | 100 | 100 | 100 |
| Oxetane$^b$ | 20 | — | — |
| HTBN$^c$ | — | 5 | — |
| VTBN$^d$ | — | — | 5 |
| Photoinitiator$^e$ | 2 | 2 | 2 |
| Comments on color of cured formulation without heating: | clear, slightly brown | clear, very slightly yellow | clear, very slightly yellow |
| Comments on color of cured formulation after heating: | Yellow | slightly yellow | slightly yellow |

UV cure method 2 g of material in an Al weighing pan, 40 sec. at 140 mW/cm$^2$, Heat cure method: 24 hrs, at 100° C.
$^a$Diglycidyl ether of hydrogenated bisphenol A epoxy resin, commercially available as EPONEX 1510 from Hexion.
$^b$3-Ethyl-3-hydroxymethyl-oxetane, commercially available as OXT-101 from Toagosei of Tokyo, Japan.
$^c$Hydroxyl terminated acrylonitrile/butadiene copolymer.
$^d$Vinyl terminated acrylonitrile/butadiene copolymer commercially available from Noveon, Inc.
$^e$Cationic photoinitiator, commercially available as UVI-6976 from Dow Chemical.

As can be seen in the results of Table 2, Sample Nos. 9 and 10, which include acrylonitrile/butadiene copolymers, exhibited less color after UV curing and after post-cure heating when compared with Sample No. 8, which did not include any acrylonitrile/butadiene copolymer but instead included only an oxetane.

Each of the samples were further analyzed by DPC and DSC to determine the UV cure and thermal cure profiles, and the cure profiles were consistent with compositions which did not include any acrylonitrile/butadiene copolymer.

Example 3

In Example 3, further cationically curable compositions were prepared with varying amounts of different acrylonitrile/butadiene copolymers. In particular, Sample Nos. 11-16 were prepared with the components set forth in Table 3. Each of the components were combined and the samples were thereafter mixed by hand in plastic beakers and sonicated for 20 minutes at 50° C. to ensure that the components were dissolved in their respective samples. The samples were each tested to evaluate coloration as in Example 2. In particular, two grams of each sample were poured into aluminum weighing pans and exposed to UV light at 140 mW/cm$^2$ for 40 seconds. The pans were cut in half and one half of each pan was kept at ambient temperature and the other half was heated at 100° C. for 24 hours. Any change in color at the macroscopic level was observed and recorded. The results are shown in Table 3 below.

TABLE 3

| | Sample No./Amt. (Parts per 100 parts of resin) | | | | | |
|---|---|---|---|---|---|---|
| COMPONENT | 11 | 12 | 13 | 14 | 15 | 16 |
| Epoxy resin$^a$ | 100 | 100 | 100 | 100 | 100 | 100 |
| HTBN$^b$ | 1 | 2 | 3 | — | — | — |
| VTBN$^c$ | — | — | — | 1 | 2 | 3 |
| Photoinitiator$^d$ | 2 | 2 | 2 | 2 | 2 | 2 |
| Comments on color of cured formulation without heating: | Clear and very slightly brown | Clear and very slightly yellow | Clear and very slightly yellow | Clear and very slightly brown | Clear and very slightly yellow | Clear and very slightly yellow |
| Comments on color of cured formulation after heating: | Yellow | Slightly yellow | Slightly yellow | Yellow | Slightly yellow | Slightly yellow |

UV cure method: 2 g of material in an Al weighing pan, 40 sec. at 140 mW/cm$^2$, Heat cure method: 24 hrs. at 100° C.
$^a$Diglycidyl ether of hydrogenated bisphenol A epoxy resin, commercially available as EPONEX 1510 from Hexion.
$^b$Hydroxyl terminated acrylonitrile/butadiene copolymer.
$^c$Vinyl terminated acrylonitrile/butadiene copolymer commercially available from Noveon, Inc.
$^d$Cationic photoinitiator, commercially available as UVI-6976 from Dow Chemical.

As can be seen in Table 3, each of the samples including an acrylonitrile/butadiene copolymer cured clear, with only slight coloring. Post cure heating of the samples did not have a major effect on the coloring. Comparison of these samples suggests that the acrylonitrile/butadiene copolymer has an affect on the coloring, with increased concentrations of the acrylonitrile/butadiene copolymer reducing coloring after cure and after post-cure heating.

Additionally, each of Sample Nos. 11-16 was subjected to DPC and DSC and the curing profiles of each of these samples was consistent with that of a control which did not include any additive.

Example 4

In Example 4, cationically curable compositions were prepared with different acrylonitrile/butadiene copolymers having various terminal reactive groups. In particular, Sample Nos. 17-21 were prepared according to the formulations set forth in Table 4 in accordance with the mixing procedure set forth above. Each sample was thereafter tested for coloration, with two grams of each sample poured into aluminum weighing pans and exposed to UV light at 140 mW/cm$^2$ for 30 seconds. The yellowness index for each sample was observed using a Datacolor International SH00 PLUS-CT instrument, with the results shown in Table 4 below.

TABLE 4

| COMPONENT | Sample No./Amt. (Parts per 100 parts of resin) | | | | |
|---|---|---|---|---|---|
| | 17 | 18 | 19 | 20 | 21 |
| Epoxy resin$^a$ | 100 | 100 | 100 | 100 | 100 |
| VTBN$^b$ | — | 5 | — | — | — |
| HTBN$^c$ | — | — | 5 | — | — |
| CTBN$^d$ | — | — | — | 5 | — |
| ETBN$^e$ | — | — | — | — | 5 |
| Photoinitiator$^f$ | 2 | 2 | 2 | 2 | 2 |
| Yellowness Index | 35.92 | 8.96 | 8.57 | 11.66 | 8.97 |

UV cure method: 2 g of material in an Al weighing pan, 30 sec. at 140 mW/cm$^2$; Instrument: Datacolor International SF600 PLUS-CT.
$^a$Diglycidyl ether of hydrogenated bisphenol A epoxy resin, commercially available as EPONEX 1510 from Hexion.
$^b$Vinyl terminated acrylonitrile/butadiene copolymer, commercially available from Noveon, Inc.
$^c$Hydroxyl terminated acrylonitrile/butadiene copolymer.
$^d$Carboxyl terminated acrylonitrile/butadiene copolymer, commercially available from Noveon, Inc.
$^e$Epoxy terminated acrylonitrile/butadiene copolymer, commercially available from Noveon, Inc.
$^f$Cationic photoinitiator, commercially available as UVI-6976 from Dow Chemical As can be seen in Table 4, Sample Nos. 18-21, which contained functionally terminated acrylonitrile/butadiene copolymers, exhibited significantly reduced color when compared with Sample No. 17, representing a sample without any copolymer additive.

Example 5

In Example 5, compositions were prepared with pure acrylonitrile and pure butadiene polymers. Sample Nos. 22-27 were prepared according to the formulations set forth in Table 5 in accordance with the mixing procedure set forth above. Each sample was thereafter tested for coloration, with two grams of each sample poured into aluminum weighing pans and exposed to UV light at 140 mW/cm$^2$ for 40 seconds. Any change in color at the macroscopic level was observed and recorded, with the results shown in Table 5 below.

TABLE 5

| COMPONENT | Sample No./Amt. (Parts per 100 parts of resin) | | | | | |
|---|---|---|---|---|---|---|
| | 22 | 23 | 24 | 25 | 26 | 27 |
| Epoxy resin$^a$ | 100 | 100 | 100 | 100 | 100 | 100 |
| Polyacrylonitrile$^b$ | — | 5 | 10 | — | — | — |
| Polybutadiene$^c$ | — | — | — | 1 | 3 | 5 |
| Photoinitiator$^d$ | 2 | 2 | 2 | 2 | 2 | 2 |
| Comments on color of UV cured formulation without heating: | Light brown | Light brown | Light brown | Light brown | Light brown | Light brown |

UV cure method: 2 g of material in an Al weighing pan, 40 sec. at 140 mW/cm$^2$
$^a$Diglycidyl ether of hydrogenated bisphenol A epoxy resin, commercially available as EPONEX 1510 from Hexion.
$^b$Polyacrylonitrile (Mn = 22,000) commercially available from Aldrich.
$^c$Polybutadiene (Mn = 3,000) commercially available from Aldrich.
$^d$Cationic photoinitiator, commercially available as UVI-6976 from Dow Chemical.

As can be seen in Table 5, all of Sample Nos. 22-27 demonstrated an undesirable light brown color, with the samples containing either pure polyacrylonitrile or pure polybutadiene polymers consistent in color with the control (Sample No. 22).

Example 6

This example tests the impact strength of compositions incorporating acrylonitrile/butadiene copolymers. In particular, Sample Nos. 28-34 were prepared with the components specified in Table 6, in accordance with the mixing procedures set forth in the previous examples.

Seven sets of lap shear specimens were separately prepared by individually applying each of Sample Nos. 28-34 to a separate clean steel lap shear. Each coated specimen was exposed to radiation in the ultraviolet range of the electromagnetic spectrum at an intensity of 140 mW/cm$^2$ for 4 seconds. Thereafter, a second lap shear was applied thereover such that a one inch overlap existed between the lap shears with the sample therebetween. The assembled lay shear specimens were further exposed to a temperature of 150° C. for one hour, after which they were tested for impact strength of the adhesive bond in shear according to General Motors Engineering Standards Side Impact Test Method GM9751P (1988) using a 2 kg. impact head. Test results are shown in Table 6.

TABLE 6

| COMPONENT | Sample No./Amt. (Parts per 100 parts of resin) | | | | | | |
|---|---|---|---|---|---|---|---|
| | 28 | 29 | 30 | 31 | 32 | 33 | 34 |
| Epoxy resin$^a$ | 100 | 100 | 100 | 100 | 100 | 100 | 100 |
| HTBN$^b$ | — | 5 | 10 | 20 | — | — | 5 |
| VTBN$^c$ | — | — | — | — | 5 | 10 | — |
| Oxetane$^d$ | — | — | — | — | — | — | 20 |
| Photoinitiator$^e$ | 2 | 2 | 2 | 2 | 2 | 2 | 2 |
| Impact Strength (J): | 5.0 | 7.2 | 8.0 | 4.2 | 6.8 | 7.8 | 10.7 |

$^a$Diglycidyl ether of hydrogenated bisphenol A epoxy resin, commercially available as EPONEX 1510 from Hexion.
$^b$Hydroxyl terminated acrylonitrile/butadiene copolymer.
$^c$Vinyl terminated acrylonitrile/butadiene copolymer commercially available from Noveon, Inc.
$^d$3-Ethyl-3-hydroxymethyl-oxetane, commercially available as OXT-101 from Toagosei of Tokyo, Japan.
$^e$Cationic photoinitiator, commercially available as UVI-6976 from Dow Chemical.

As shown from the data in Table 6, the inventive compositions provide acceptable impact strength. Moreover, specimens bonded using samples including the acrylonitrile/butadiene copolymers according to the present invention exhibited better impact strength than the control Sample No. 28 without any acrylonitrile/butadiene copolymer.

What is claimed is:

1. A photoinitiated cationically curable composition, comprising:
   (a) at least one substantially saturated epoxy component comprising at least two glycidyl ether groups;
   (b) at least one functionalized acrylonitrile/butadiene copolymer in liquid form; and
   (c) at least one cationic photoinitiator,
wherein the cationic photoinitiator comprises a mixture of triarylsulfonium hexafluoroantimonate salts in propylene carbonate, the triarylsulfonium hexafluoroantimonate salts being selected from the group consisting of:

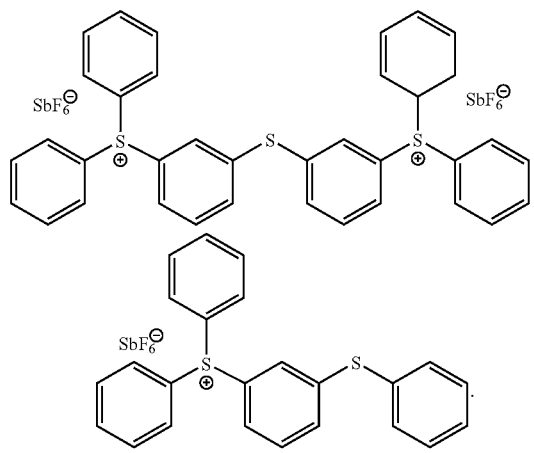

2. The composition according to claim 1, wherein the at least one functionalized acrylonitrile/butadiene copolymer is present in an amount from about 0.1 to about 25 weight percent on a basis of total weight of the composition.

3. The composition according to claim 1, wherein the substantially saturated epoxy component is a diglycidyl ether epoxy compound having a saturated backbone selected from the group consisting of hydrogenated bisphenol A, hydrogenated bisphenol F, hydrogenated bisphenol S and hydrogenated biphenyl.

4. The composition according to claim 1, wherein the substantially saturated epoxy component comprises:

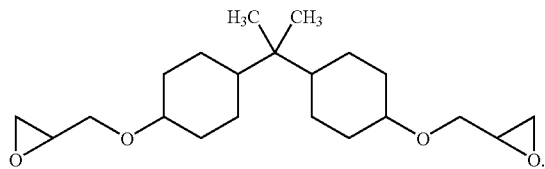

5. The composition according to claim 1, wherein the functionalized acrylonitrile/butadiene copolymer in liquid form has at least one functional group which is a hydroxyl functional group, a vinyl functional group, a carboxyl functional group, an epoxy functional group, or an acrylate functional group.

6. The composition according to claim 1, wherein the mole percentage of acrylonitrile in the copolymer is from about 10 to 26% and the mole percentage of butadiene in the copolymer is from about 74 to 90%.

7. The composition according to claim 1, wherein the cationic photoinitiator is selected from the group consisting of triarylsulfonium, diaryliodonium and aryl diazonium salts containing non-nucleophilic counterions, 4-methoxybenzenediazonium hexafluorophosphate, benzenediazonium tetrafluoroborate, diphenyl iodonium chloride, diphenyl iodonium hexafluorophosphate, 4,4-dioctyloxydiphenyl iodonium hexafluorophosphate, triphenylsulfonium tetrafluoroborate, diphenyltolylsulfonium hexafluorophosphate, phenylditolylsulfonium hexafluoroarsenate, diphenylthiophenoxyphenylsulfonium hexafluoroantimonate, triaryl sulfonium hexafluoroantimonate, triaryl sulfonium hexafluorophosphate and diaryl iodonium hexafluoroantimonate.

8. The composition according to claim 7, wherein the cationic photoinitiator is selected from the group consisting of triarylsulfonium, diaryliodonium and aryl diazonium salts containing non-nucleophilic counterions.

9. The composition according to claim 1, wherein the cationic photoinitiator comprises a cationic counter ion within the following structure:

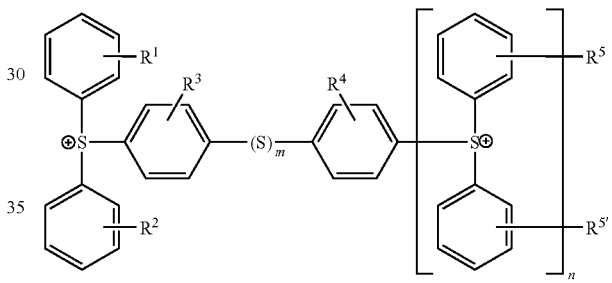

wherein $R^1$, $R^2$, $R^3$, $R^4$, $R^5$ and $R^{5'}$ are each independently selected from the group consisting of H, $C_{1-6}$ alkyl, $C_{2-6}$ alkenyl, halo, hydroxyl and carboxyl, n is 0-3 and m is 0-1.

10. The composition according to claim 1, wherein the cationic photoinitiator comprises tolylcumyl iodonium tetrakis(pentafluorophenyl)borate.

11. The composition according to claim 1, wherein cationic photoinitiator is used in an amount within the range of about 0.1 to about 3 percent by weight of the total composition.

12. The composition according to claim 1, further comprising a free radical initiator.

13. The composition according to claim 12, wherein the free radical initiator comprises a phenone initiator.

14. The composition according to claim 12, wherein the free radical initiator is selected from the group consisting of 1-hydroxy cyclohexyl phenyl ketone, 2,2-dimethoxy-2-phenyl acetophenone, 1-hydroxy cyclohexyl phenyl ketone, benzophenone, 2-benzyl-2-N,N-dimethlamino-1-(4-morpholino phenyl)-1-butane, 2-methyl-1-[-4(methylthio)phenyl]-2-morpholino propane-1-one, 2-hydroxyl-2-methyl-1-phenyl-propane-1-one, 1-hydroxycyclohexyl phenyl ketone, 2,2-dimethoxy-2-phenyl acetophenone, 4-(2-hydroxyethyoxy)phenyl-(2-hydroxy-2-methylpropyl)ketone, 2,4,6-trimethylbenzoyl-diphenylphosphine oxide, and combinations thereof.

15. The composition according to claim 1, further comprising an oxetane-containing component.

16. The composition according to claim 1, wherein the photoinitiator is triggered by exposure to radiation in the visible range of the electromagnetic spectrum.

17. A method of bonding substrates, comprising the steps of:
(a) providing a first substrate;
(b) providing a second substrate;
(c) providing a composition according to claim 1 on at least one of the first or second substrates;
(d) mating the first and second substrates; and
(e) exposing the composition to conditions sufficient to initiate cure thereof.

18. The method of claim 17, wherein the conditions comprise exposure to ultraviolet radiation within a wavelength of from about 254 to 405 nm.

19. The method of claim 17, wherein the conditions comprise exposure to temperatures of from about 60 to 140° C.

20. A method of curing a composition comprising:
(a) providing a composition according to claim 1;
(b) exposing the composition to ultraviolet radiation to initiate curing of the composition; and
(c) exposing the composition to temperatures of from about 60 to 140° C.;
wherein the cured composition exhibits little to no color change after said thermal exposure of step (c).

21. The method of claim 20, wherein the cured composition exhibits less color than a color of a composition formed by the same curing process and thermal exposure, and from the same components in the same amounts, except for the absence of at least one acrylonitrile/butadiene copolymer.

22. The method of claim 20, wherein the cured composition exhibits improved impact strength when compared with a composition formed by the same curing process and thermal exposure, and from the same components in the same amounts, except for the absence of at least one acrylonitrile/butadiene copolymer.

23. A method of preventing color formation in a cationically curable composition including at least one epoxy component and a cationic photoinitiator, wherein the cationic photoinitiator comprises a mixture of triarylsulfonium hexafluoroantimonate salts in propylene carbonate, the triarylsulfonium hexafluoroantimonate salts being selected from the group consisting of:

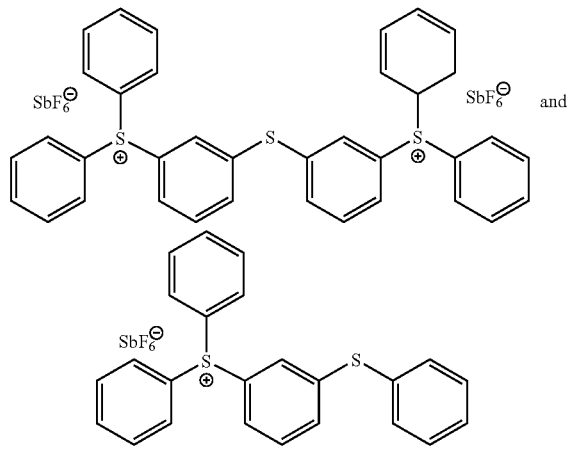

subjected to ultraviolet curing followed by thermal exposure, the method comprising incorporating at least one acrylonitrile/butadiene copolymer into the curable composition prior to subjecting the composition to ultraviolet curing and thermal exposure.

24. A method of preventing color formation during thermal treatment of a cationically cured composition, comprising:
(a) providing a cationically cured composition according to claim 1; and
(b) heating the cationically cured composition to form a fully cured composition;
such that a resulting color of the fully cured composition exhibits little to no color change from a color of the cationically cured composition prior to the heating step.

25. The method of claim 24, wherein the resulting color of the thermally cured composition exhibits less color than a color of a composition formed by the same curing process and heating step, and from the same components in the same amounts, except for the absence of at least one acrylonitrile/butadiene copolymer.

26. The composition of claim 1, wherein when cured by exposure to UV light the cured composition exhibits a significantly reduced color when measured on the Yellowness Index.

27. A photoinitiated cationically curable composition, comprising:
(a) at least one substantially saturated epoxy component comprising at least two glycidyl ether groups;
(b) at least one functionalized acrylonitrile/butadiene copolymer in liquid form; and
(c) at least one cationic photoinitiator, wherein the functionalized acrylonitrile/butadiene copolymer in liquid form has at least one functional group which is a vinyl functional group.

28. A photoinitiated cationically curable composition, comprising:
(a) at least one substantially saturated epoxy component comprising at least two glycidyl ether groups;
(b) at least one functionalized acrylonitrile/butadiene copolymer in liquid form; and
(c) at least one cationic photoinitiator, wherein the functionalized acrylonitrile/butadiene copolymer in liquid form has at least one functional group which is an epoxy functional group.

29. A photoinitiated cationically curable composition comprising:
(a) at least one substantially saturated epoxy component comprising at least two glycidyl ether groups;
(b) at least one functionalized acrylonitrile/butadiene copolymer in liquid form; and
(c) at least one cationic photoinitiator, wherein the functionalized acrylonitrile/butadiene copolymer in liquid form has at least one functional group which is an acrylate functional group.

30. The composition according to claim 27, further comprising a free radical initiator.

31. The composition according to claim 28, further comprising a free radical initiator.

32. The composition according to claim 29, further comprising a free radical initiator.

33. A method of bonding substrates, comprising the steps of:
(a) providing a first substrate;
(b) providing a second substrate;
(c) providing a composition according to claim 27 on at least one of the first or second substrates;
(d) mating the first and second substrates; and
(e) exposing the composition to conditions sufficient to initiate cure thereof.

34. A method of bonding substrates, comprising the steps of:
- (a) providing a first substrate;
- (b) providing a second substrate;
- (c) providing a composition according to claim 28 on at least one of the first or second substrates;
- (d) mating the first and second substrates; and
- (e) exposing the composition to conditions sufficient to initiate cure thereof.

35. A method of bonding substrates, comprising the steps of:
- (a) providing a first substrate;
- (b) providing a second substrate;
- (c) providing a composition according to claim 29 on at least one of the first or second substrates;
- (d) mating the first and second substrates; and
- (e) exposing the composition to conditions sufficient to initiate cure thereof.

36. A method of curing a composition comprising the steps of:
- (a) providing a composition according to claim 27;
- (b) exposing the composition to ultraviolet radiation to initiate curing of the composition; and
- (c) exposing the composition to temperatures of from about 60 to 140° C.;
- wherein the cured composition exhibits little to no color change after said thermal exposure of step (c).

37. A method of curing a composition comprising the steps of:
- (a) providing a composition according to claim 28;
- (b) exposing the composition to ultraviolet radiation to initiate curing of the composition; and
- (c) exposing the composition to temperatures of from about 60 to 140° C.;
- wherein the cured composition exhibits little to no color change after said thermal exposure of step (c).

38. A method of curing a composition comprising the steps of:
- (a) providing a composition according to claim 29;
- (b) exposing the composition to ultraviolet radiation to initiate curing of the composition; and
- (c) exposing the composition to temperatures of from about 60 to 140° C.;
- wherein the cured composition exhibits little to no color change after said thermal exposure of step (c).

39. A method of preventing color formation during thermal treatment of a cationically cured composition, comprising:
- (a) providing a cationically cured composition according to claim 27; and
- (b) heating the cationically cured composition to form a fully cured composition;
- such that a resulting color of the fully cured composition exhibits little to no color change from a color of the cationically cured composition prior to the heating step.

40. A method of preventing color formation during thermal treatment of a cationically cured composition, comprising:
- (a) providing a cationically cured composition according to claim 28; and
- (b) heating the cationically cured composition to form a fully cured composition;
- such that a resulting color of the fully cured composition exhibits little to no color change from a color of the cationically cured composition prior to the heating step.

41. A method of preventing color formation during thermal treatment of a cationically cured composition, comprising:
- (a) providing a cationically cured composition according to claim 29; and
- (b) heating the cationically cured composition to form a fully cured composition;
- such that a resulting color of the fully cured composition exhibits little to no color change from a color of the cationically cured composition prior to the heating step.

* * * * *